US011840107B1

(12) United States Patent
Kaplan et al.

(10) Patent No.: US 11,840,107 B1
(45) Date of Patent: Dec. 12, 2023

(54) SYSTEMS AND METHODS FOR GENERATING TACTILE 3D MAPS

(71) Applicant: University of South Florida, Tampa, FL (US)

(72) Inventors: Howard David Kaplan, Wesley Chapel, FL (US); Spenser Fox Mason, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 109 days.

(21) Appl. No.: 17/202,045

(22) Filed: Mar. 15, 2021

Related U.S. Application Data

(62) Division of application No. 16/155,252, filed on Oct. 9, 2018.

(60) Provisional application No. 62/569,930, filed on Oct. 9, 2017.

(51) Int. Cl.

| | |
|---|---|
| *B41M 3/16* | (2006.01) |
| *B33Y 80/00* | (2015.01) |
| *B33Y 50/02* | (2015.01) |
| *G06T 17/20* | (2006.01) |
| *G06T 11/20* | (2006.01) |

(52) U.S. Cl.
CPC ............... *B41M 3/16* (2013.01); *B33Y 50/02* (2014.12); *B33Y 80/00* (2014.12); *G06T 11/203* (2013.01); *G06T 17/20* (2013.01)

(58) Field of Classification Search
CPC ................................ B41M 3/02; B41M 3/16
See application file for complete search history.

(56) References Cited

U.S. PATENT DOCUMENTS

| | | |
|---|---|---|
| 9,087,455 B2 | 7/2015 | Sai et al. |
| 9,229,534 B2 | 1/2016 | Galor |
| 9,711,065 B2 | 7/2017 | Yu et al. |

OTHER PUBLICATIONS

Gotzelmann et al., Towards Automatically Generated Tactile Detail Maps by 3D Printers for Blind Persons, K. Miesenberger et al. (Eds.): ICCHP 2014, Part II, LNCS 8548, pp. 1-7, 2014 (Year: 2014).*

Rutgers, Bates, Feb. 22, 2016, Braille Maps for Blind and Visually Impaired Created with 3-D Printing Technology at Rutgers (https://www.rutgers.edu/news/braille-maps-blind-and-visually-impaired-created-3-d-printing-technology-rutgers) (Year: 2016).*

(Continued)

*Primary Examiner* — Timothy Kennedy
(74) *Attorney, Agent, or Firm* — QUARLES & BRADY LLP

(57) ABSTRACT

A method for generating three dimensional indicators for the visually impaired. The method includes selecting one or more pre-designed symbols from a plurality of pre-designed symbols. The pre-designed symbols represent standard building layout features and are sized to be readable via a physical touch. The method further includes inserting the one or more selected symbols into a two dimensional digital layout, and generating one or more of an orientation object and a legend object into the two dimensional digital layout. The method further includes converting the two dimensional digital layout into a three dimensional digital model, and generating an output file including the three dimensional model in a format compatible with a three dimensional printing device.

9 Claims, 12 Drawing Sheets

(56) References Cited

OTHER PUBLICATIONS

Gotzelmann, Interactive Tactile Maps for Blind People using Smartphones' Integrated Cameras, ITS 2014, Nov. 16-19, 2014, Dresden, Germany, ACM 978-1-4503-2587—May 14, 2011, http://dx.doi.org/10.1145/2669485.2669550 (Year: 2014).*

Al-Khalifa, Utilizing QR Code and Mobile Phones for Blinds and Visually Impaired People, K. Miesenberger et al. (Eds.): ICCHP 2008, LNCS 5105, pp. 1065-1069, 2008 (Year: 2008).*

Orti et al., Improving Tactile Map Usability through 3D Printing Techniques: An Experiment with New Tactile Symbols, The Cartographic Journal, The World of Mapping 52:1, 51-57, (2015), DOI: 10.1179/1743277413Y.0000000046 (Year: 2015).*

Zeng et al., Interactive Audio-haptic Map Exploreron a Tactile Display, Interacting with Computers, vol. 27 No. 4, 2015, doi: 10.1093/iwc/iwu006 (Year: 2015).*

\* cited by examiner ural digital image.

SYSTEMS AND METHODS FOR GENERATING TACTILE 3D MAPS

CROSS-REFERENCE TO RELATED APPLICATIONS

This application is a divisional of and claims the benefit of U.S. Provisional patent application Ser. No. 16/155,252, filed on Oct. 9, 2018, which claims the benefit of U.S. Provisional Patent Application No. 62/569,930, filed on Oct. 9, 2017, the contents of both of which are incorporated herein by reference in their entireties.

BACKGROUND OF THE INVENTION

Maps and building layouts are generally presented as two-dimensional objects, which can present a problem for visually impaired persons. Specifically, building layout maps, such as those provide on placards at various points in a building or structure, may only provide a two-dimensional images of the building layout. In some instances, these two-dimensional images may include critical information, such as evacuation routes within the building or structure. While text may be presented three-dimensionally (e.g. via braille), this only provides textual information to the user, which may not fully describe the layout, as would be possible using a visual map. Accordingly, there is a need to provide three-dimensional indicators to allow for easier access to building layouts by visually impaired persons.

SUMMARY OF THE INVENTION

One embodiment of the present disclosure is a method for generating three dimensional indicators for the visually impaired. The method includes selecting one or more pre-designed symbols from a plurality of pre-designed symbols. The pre-designed symbols represent standard building layout features and are sized to be readable via a physical touch. The method further includes inserting the one or more selected symbols into a two dimensional digital layout, and generating one or more of an orientation object and a legend object into the two dimensional digital layout. The method further includes converting the two dimensional digital layout into a three dimensional digital model, and generating an output file including the three dimensional model in a format compatible with a three dimensional printing device.

Another embodiment of the present disclosure is a system for generating three-dimensional indicators for the visually impaired. The system includes an electronic processor, a communication interface in communication with the electronic processor, and a user interface configured to receive an input from a user. The electronic processor is configured to receive a selection of one or more pre-designed symbols from a plurality of pre-designed symbols via the user interface, wherein the pre-designed symbols represent standard building layout features and are sized to be readable via a physical touch. The electronic processor is further configured to receive a desired location of the selected pre-designed symbol within a two dimensional digital layout via the user interface and insert the selected pre-designed symbol within the two dimensional layout in the desired location. The electronic processor is further configured to generate an orientation object and a legend object within the two dimensional digital layout, convert the two dimensional digital layout into a three dimensional digital model, generate an output file including the three dimensional model in a format compatible with a three dimensional printing device, and output the output file to the three dimensional device via the communication interface.

Another embodiment of the present disclosure is a method for generating maps that are readable by visually impaired persons. The method includes selecting one or more pre-designed symbols from a number of pre-designed symbols, wherein the pre-designed symbols represent standard building layout features and are configured to be readable via a physical touch. The pre-designed symbols are selected from a list including a stairway symbol, a door symbol, an elevator symbol, a hallway symbols, and an evacuation route symbol. The method further includes inserting the one or more selected symbols into a two dimensional digital layout, and generating one or more of an orientation object and a legend object into the two dimensional digital layout, wherein the legend object is automatically generated based on the selected pre-designed symbols in the two-dimensional digital layout. The method further includes converting the two dimensional digital layout into a visually impaired readable model, and generating an output file including the visually impaired readable model.

Other aspects of the invention will become apparent by consideration of the detailed description and accompanying drawings.

DETAILED DESCRIPTION

Figure 1:
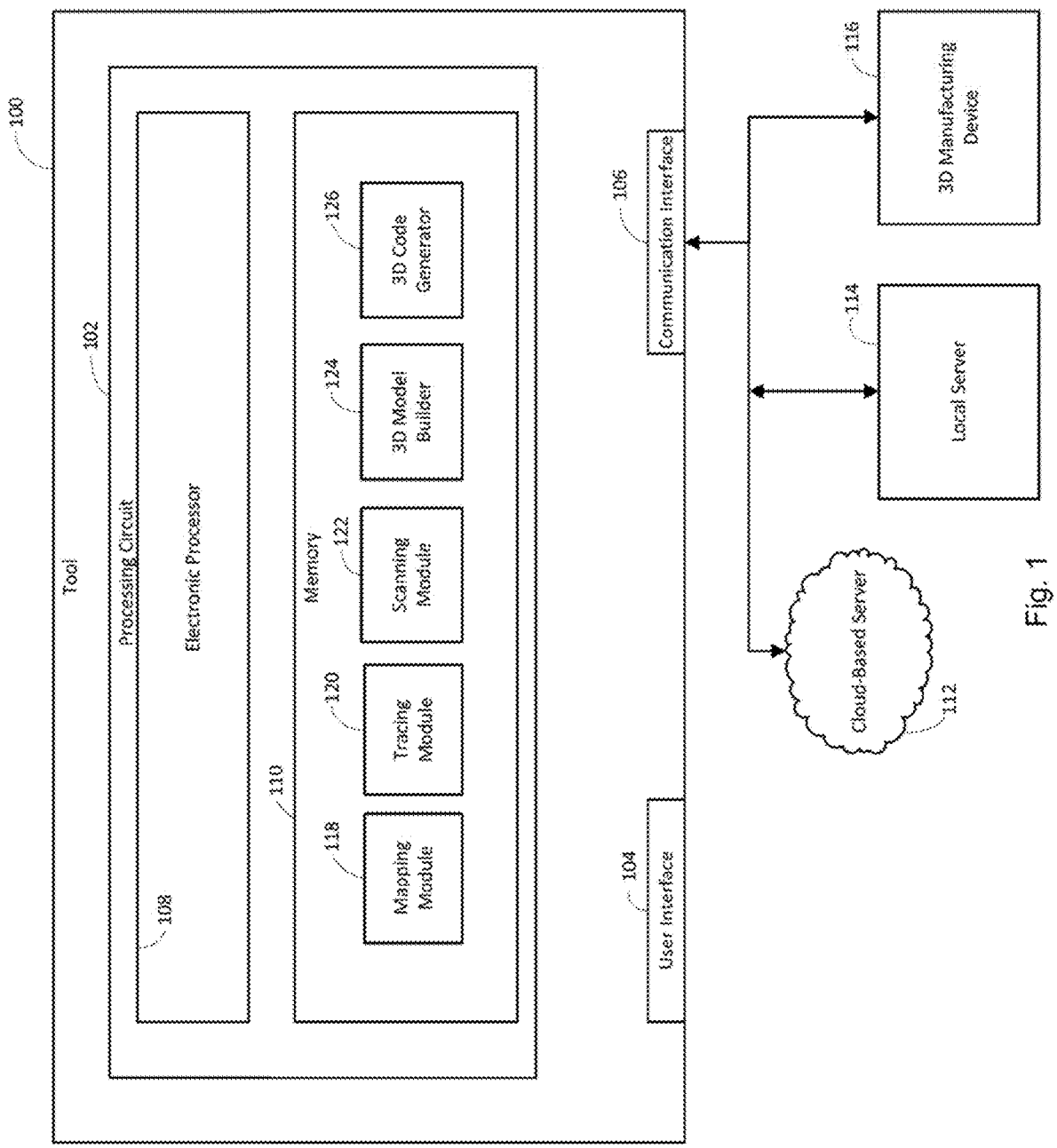
FIG. 1 is a block diagram illustrating a system for generating 3D indicators, according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium"comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including,""containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions. Articles "a" and "an" are used herein to refer to one or to more than one (at least one) of the grammatical object of the article. By way of example, "an element" means at least one element and can include more than one element. Unless otherwise defined, all technical terms used herein have the same meaning as commonly understood by one of ordinary skill in the art to which this disclosure belongs.

Embodiments are described herein with reference to flowchart illustrations and/or block diagrams and/or figures. The flowchart, block diagrams and other illustrations in the present disclosure illustrate the architecture, functionality, and operation of possible implementations of systems, methods, computer program products (non-transitory computer-readable medium storing instructions executable one electronic processors, such as a microprocessor, to perform a set of functions), and the like according to various embodiments of the present invention. In this regard, each block in the flowchart or block diagrams, or accompanying figures herein may represent a module, segment, or portion of instructions, which comprises one or more executable instructions for implementing the specified logical function(s). In some alternative implementations, the functions noted in the block or figures may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and/or figures and combinations of blocks in the block diagrams and/or flowchart illustration and/or figures can be implemented by special purpose hardware-based systems that perform the specified functions or acts or carry out combinations of special purpose hardware and computer instructions.

The present disclosure provides, in part, a system for allowing a user to make maps or other printed material for blind and/or low vision individuals. The systems and methods described herein provide tools to add information, such as emergency evacuation routes, movable doors, and symbol legend keys to the map, making it therefore more effective and easy for blind and low vision users to understand.

One aspect of the present disclosure provides a tool 100 for allowing a user to generate three-dimensional models and objects as described above. For clarification and consistency within the specification, the term three dimensional may be represented as 3D, and vice versa. Further, the term two dimensional may be represented as 2D, and vice versa. The tool 100 may include a processing circuit 102, a user interface 104, and a communication interface 106. The processing circuit 102 may include an electronic processor 108 and a memory 110. The electronic processor 108 may be implemented as a programmed microprocessor, an application specific integrated circuit (ASIC), one or more field programmable gate arrays (FPGA), a group of processing components, or other suitable electronic processing components.

The memory 110 (e.g., memory, memory unit, storage device, etc.) includes one or more devices (e.g., RAM, ROM, Flash memory, hard disk storage, etc.) for storing data and/or computer code for completing or facilitating the various processes, layers, and modules described herein. The memory 110 can be or include volatile memory or non-volatile memory. The memory 110 can include database components, object code components, script components, or any other type of information structure for supporting the various activities and information structure described in the present application. According to one example, the memory 110 is communicably connected to the electronic processor 108 via the processing circuit 102 and can include computer code for executing (e.g., by the processing circuit 102 and/or the electronic processor 108) one or more processes described herein.

The user interface 104 may include one or more devices for allowing the user to interface with the tool 100. In one embodiment, the user interface is a touch screen interface (e.g., capacitive, inductive, resistive, etc.) which can allow the user to interface with the tool. In other embodiments, the user interface may include a display device, such as a television, computer monitor, tablet screen, phone screen, or other imaging device, in combination with an input device. Input devices may include a keyboard, a touchpad, a touchscreen, a mouse, or any other known input device. In some embodiments, the tool 100 may be implemented or accessed using a computing device, such as a laptop computer or a personal computer, wherein the computer screen and associated input devices may be used as the user interface 104.

The communication interface 106 is configured to facilitate communications between the processing circuit 102 and one or more external devices and/or networks. The communication interface 106 can be or include wired or wireless interfaces (e.g., jacks, antennas, transmitters, receivers, transceivers, wire terminals, etc.) for conducting data communications between the tool 100 and one or more external devices. In some embodiments, the communication interface 106 is a wireless communication interface such as cellular (3G, 4G, LTE, CDMA, 5G, etc.), Wi-Fi, Wi-MAX, ZigBee, ZigBee Pro, Bluetooth, Bluetooth Low Energy (BLE), RF, LoRA, LoRaWAN, Near Field Communication (NFC), Radio Frequency Identification (RFID), ZOWave, 6LoWPAN, Thread, WiFi-ah, and/or other wireless communication protocols. Additionally, the communication interface 106 may include wired interfaces such as Universal Serial Bus (USB), USB-C, Firewire, Lightning, CAT5, universal asynchronous receiver/transmitter (UART), serial (RS-232, RS-485), etc. In some embodiments, the communication interface 106 communicates via a wireless antenna.

As shown in FIG. 1, the communication interface 106 may be configured to interface with one or more remote devices, such as cloud-based server 112, local server 114, and/or 3D manufacturing device 116. Cloud-based server 112 and/or local server 114 may contain data or other resources which can be utilized by the tool 100 to perform one or more functions as described herein. In one embodiment, the 3D manufacturing device 116 is a 3D printer, such as a stereolithography(SLA) 3D printer, a digital light processing (DLP) 3D printer, a fused deposition modeling (FDM) 3D printer, a selective laser sintering (SLS) 3D printer, an electronic beam melting (EBM) 3D printer, and/or a laminated object manufacturing (LOM) 3D printer. The 3D manufacturing device 116 may be configured to produce a 3D object based on an output received from the tool 100.

The memory 110 may be configured to store one or more processes for execution by the electronic processor 108 and/or the processing circuit 102. For example, the memory 110 may include a mapping module 118, a tracing module 120, a scanning module 122, a 3D model builder 124 and a 3D code generator 126. The mapping module 118 may be configured to create a 2D map based on input received via the user interface 104, as will be described in more detail below. The tracing module 120 may allow for an image or other input to be received, and which can then be "traced over" based on an input via the user interface 104, which can be used in the creation of the 2D map. In some instances, the mapping module 118 and the tracing module 120 may be configured to operate together to assist a user in generating the desired 2D map. The scanning module 122 may be configured to scan an image or other input data file to automatically generate a representation of the scanned image in either a 2D or 3D representation. This generated representation may be used by the mapping module to generate the 2D map. The 3D model builder 124 is configured to generate a digital 3D model based on a 2D map, such as a 2D image generate using the mapping module 118. The 3D model builder 124 may further be configured to interface with the 3D manufacturing device 116 via the communication interface 106.

Finally, the 3D code generator 126 is configured to generate one or more 3D codes which may be applied to the 3D model. In one example, the 3D code generator 126 may be configured to generate a QR code. The generated 3D code may be generated to either contain, or provide access to one or more multimedia files, such as audio files, video files, etc. For example, the generated 3D code may provide access to a multimedia file containing information about the map. The multimedia files may be stored on a local server, such as local server 114 or on an internet based server, such as cloud-based server 112. The 3D code may allow a user to scan the 3D code with an internet connected device (e.g. smartphone, tablet computer). The user will then be directed to access the associated file using their internet connected device. In some instances, the 3D code generator 126 may automatically generate a 3D code based on the information associated with a given 2D map. In other instances, the 3D code may be generated based on specific input provided via the user interface 104. Additionally, the 3D code symbols may be output as image files which can allow the 3D codes to be printed and placed on the manufactured 3D model, such as those described herein. In other embodiments, the 3D code symbols may be part of the 3D model.

The tool 100 may be on a computer device, such as a personal computer, or maybe associated with a local or remote server. In some embodiments, the tool 100 may be accessed using HTML, HTML5, JavaScript, WebGL or other remote access standards when the tool 100 is located on a server, remote from the user.

Figure 2:
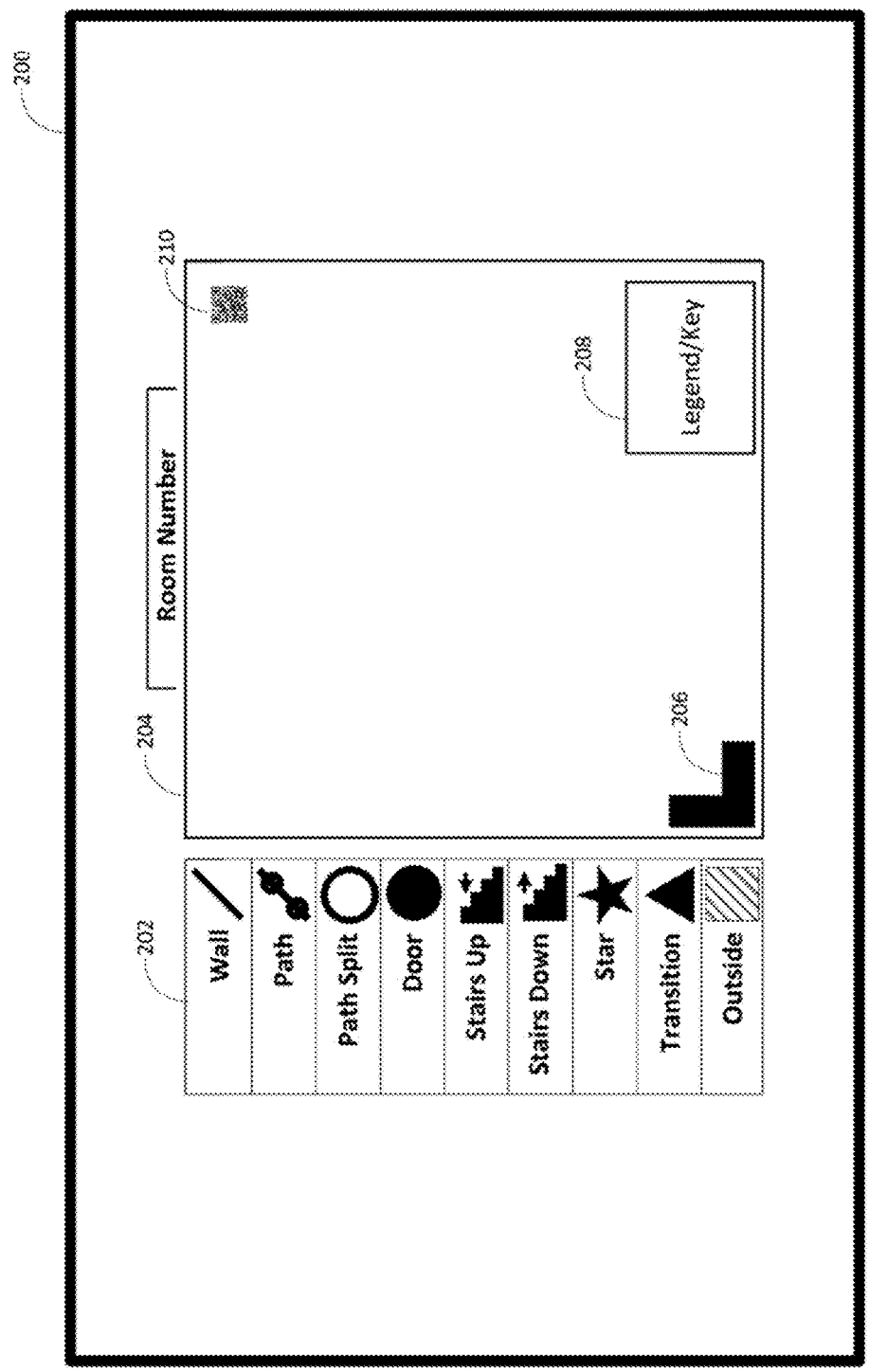
FIG. 2 is a screenshot of a two-dimensional drawing tool, according to some embodiments.

Turning now to FIG. 2, a screen shot illustrating an interface 200 of the tool 100 is shown, according to some embodiments. As shown in FIG. 2, the interface 200 is a 2D map generation interface, such as those executed by at least the mapping module 118. The 2D map generation interface may include one or more tools 202 and a drawing area 204. The interface 200 may be configured to allow a user to select and place the necessary symbols, layout required walls and paths, and/or place text to create a map.

The tools may include one or more pre-defined components associated with a given map. For example, where the map is of a building or structure, the tools 202 may include symbols and/or objects associated with the building or structure. Example symbols may include symbols representing the following: stairs, starting points, door hinges, walls, evacuation paths, multi-path directions (e.g., ring shapes), directional arrows, building /structure platforms, etc. Further, the tools 202 may include editing tools, such as texture brushes for created curved line patterns, bump brushes for creating dot patterns, text editors, text to braille conversion tools, audio indicator tools, and layer/group tools.

In some embodiments, a user may be able to select one or more of the tools and/or symbols/objects for placement in the drawing area 204. In some embodiments, the user places or interacts with the tools and/or symbols/objects using the user interface 104. In some embodiments, the user establishes the size of the drawing area 204 to correspond with the size of the desired map. In some embodiments, the tools 202 are configured based on the size of the drawing area 204. For example, symbols/objects may be automatically sized based on the provided size of the drawing area 204. In some embodiments, the sizes and spacing of the symbols/objects may be configured to correspond with a minimum sizing to allow for the symbols to be read via touch in a 3D form.

Figure 3:
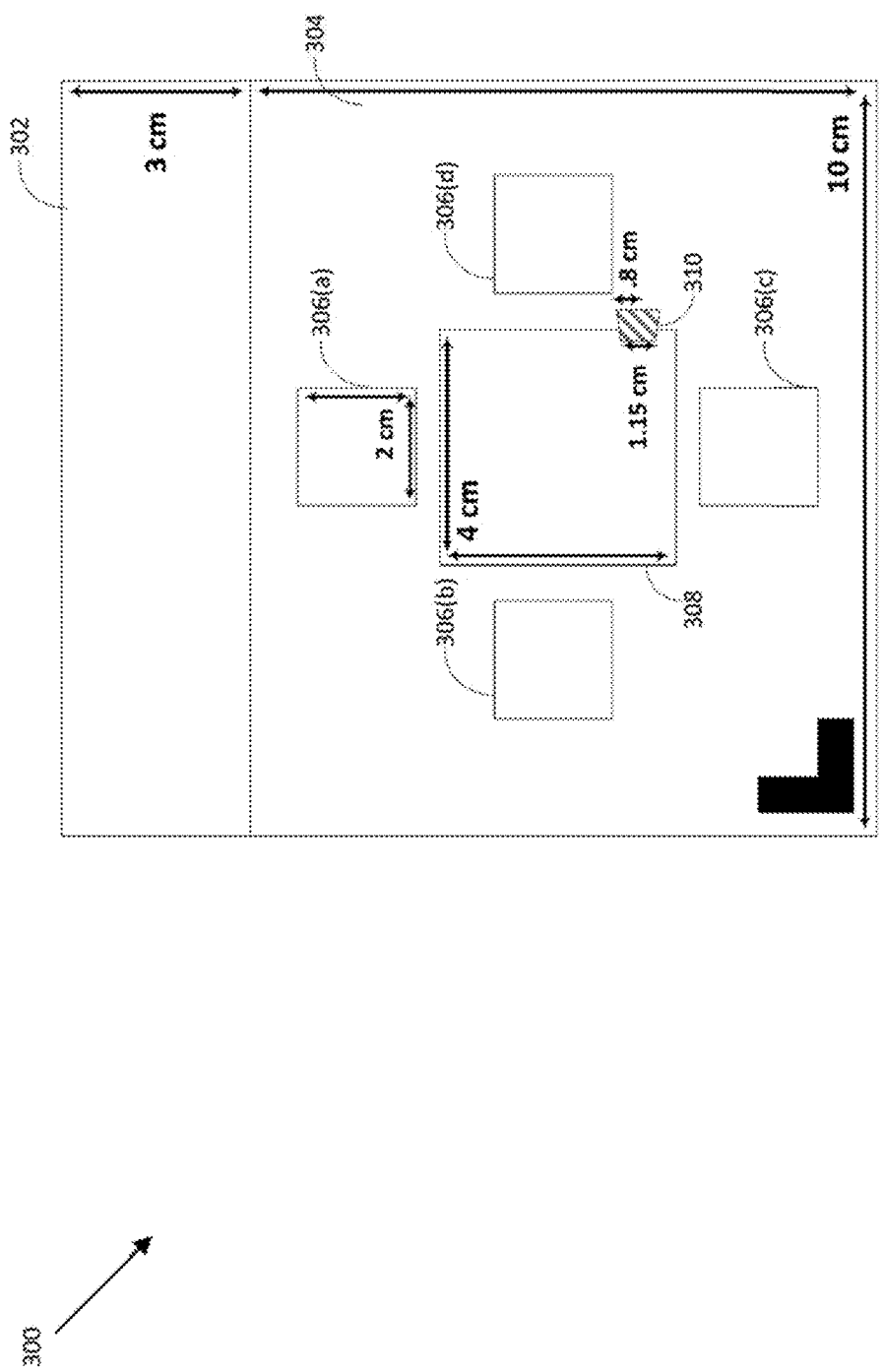
FIG. 3 is an illustration of a measurement map for optimally spacing tactile components within a given space, according to some embodiments

Turning now to FIG. 3, a measurement map 300 for optimally sizing and spacing tactile components within a given space is shown, according to some embodiments. As shown in the measurement map 300, there are multiple objects shown including a header object 302, a map area 304, four square room objects 306(a)-(d), a room object 308, and a door object 310.

The header object 302 is shown to have a size of 3 cm×10 cm, and the map area is shown to have a size of 12 cm×10 cm. The square objects 306(a)-(d) each have a size of 2 cm×2 cm, the room object 308 has a size of 4 cm×4 cm, and the door object 310 has a size of 1.15 cm×0.8 cm. In one embodiment, the mapping module 118 may be configured to optimally space the objects automatically based on the indicated sizing. Accordingly, the mapping module 118 may reposition or resize objects when a new object is inserted by the user. In some embodiments, the mapping module 118 may utilize various guidelines regarding object sizes and positions for optimal reading by a visually impaired user.

In other embodiments, the user may space the object manually based on the size of the object in relation to the size of the map and/or 3D model. The mapping module 118 may be configured to display a guide or other assistance via the user interface. In some embodiments, the guide may be overlayed with objects in the drawing area 204. The guide may provide guidance to the user regarding optimal spacing of components within the drawing space 204. In some example, the guidance may be generic for any object in the drawing area 204. In other embodiments, the guide may provide dynamic guidance to the user based on the objects placed in the drawing area 204. In some examples, the guide may be configured to provide the optimal spacing and sizing guidance to the user for interpretation by visually impaired users.

In some embodiments, the objects may be inserted via the tools 202 described above. In other embodiments, some or all of the objects may be automatically inserted into based on an image being traced or scanned using the tracing module 120 and/or the scanning module 122, described above.

Figure 4:
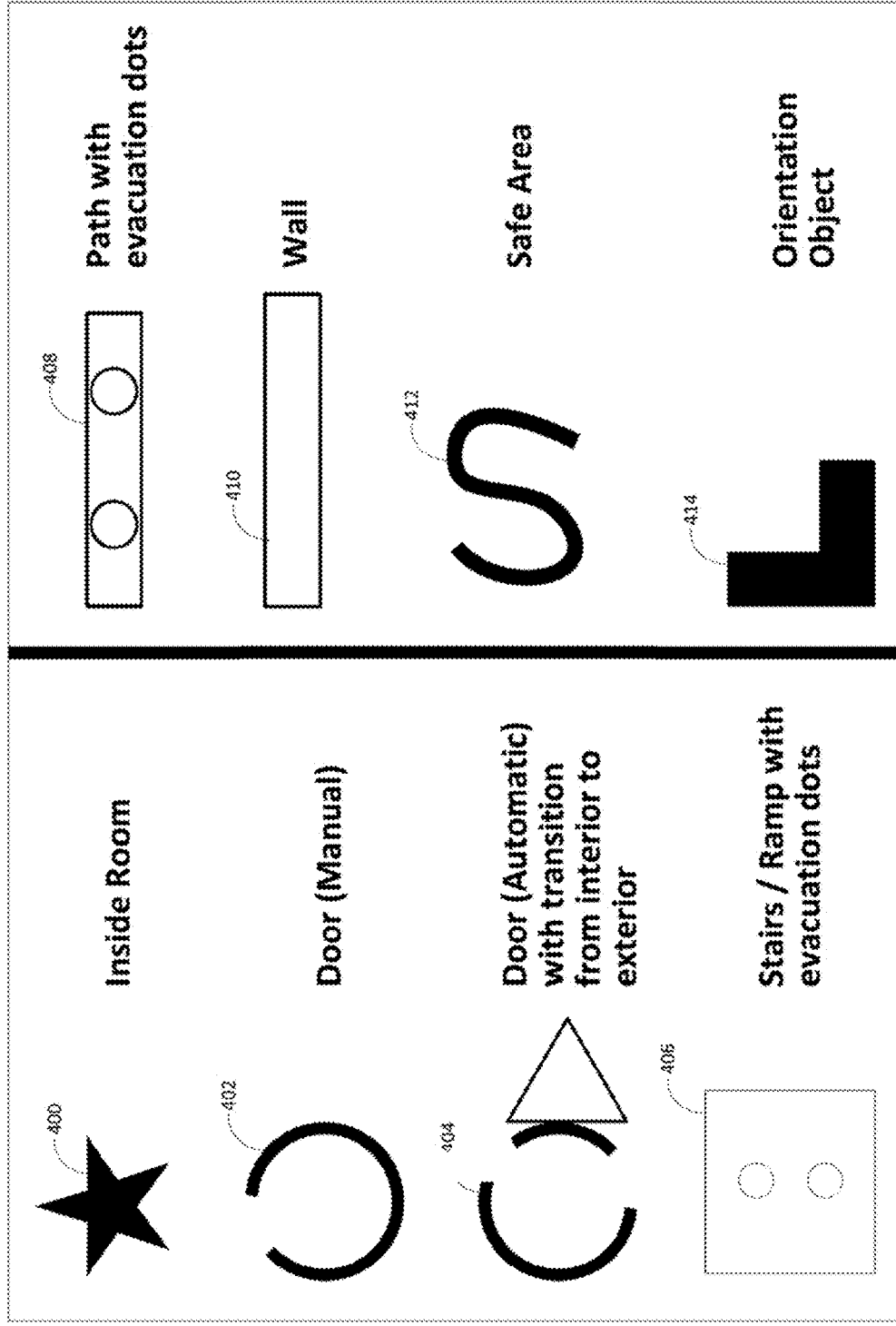
FIG. 4 is an illustration of different pre-determined symbols representing different aspects of a building or structure, according to some embodiments.

Returning now to FIG. 2, in some instances the symbols/objects are predefined, as stated above. The predefined symbols/objects may have various greyscale colors applied to the symbols that determine the heights, widths, lengths, and other 3D properties that are applied to the conversion of the 2D map image to a 3D model, as will be described below. Turning now to FIG. 4, example symbols/objects are shown according to some embodiments. The objects/symbols may include inside room objects 400, manual door objects 402, automatic door objects 404 with transitions from interior to exterior, stair/ramp objects 406, pathway objects 408, wall objects 410, safe area objects 412, and orientation symbol objects 414, such as a left corner indictor. In some embodiments, raised spheres or other indicators may be applied to objects to indicate that an object represents an evacuation route, as shown in the stairs/ramp symbol 406 and the path symbol 408. These symbols are for example purposes only and it is understood that more or fewer symbols may be available, and in different configurations. As stated above, other symbols may include text and/or braille. In some embodiments, the tools may include a text-to-braille conversion tool, which allows a user to input text which may then be converted to braille objects. In one embodiment, the text may be converted to unified English braille. In other embodiments, the text may be converted to English Braille American Edition braille. Further, the braille may be alphabetic braille and/or literary braille.

Returning again to FIG. 2, an orientation object 206 may be placed in the drawing area 204. In some examples, the orientation object 206 is a corner indicator. In one embodiment, the orientation object 206 is placed in the lower left corner; however, other locations are also contemplated. A legend/key 208 may further be placed in the drawing area 204. In one embodiment, the legend/key 208 is automatically generated as the tool 100 collects and uses data related to the symbols/objects placed in the drawing area 204. This allows the legend/key 208 to be unique to a given map, thereby reducing the amount of space needed for a standard legend/key. Further, a 3D code object 210 may be inserted as well, as described herein.

Figure 5:
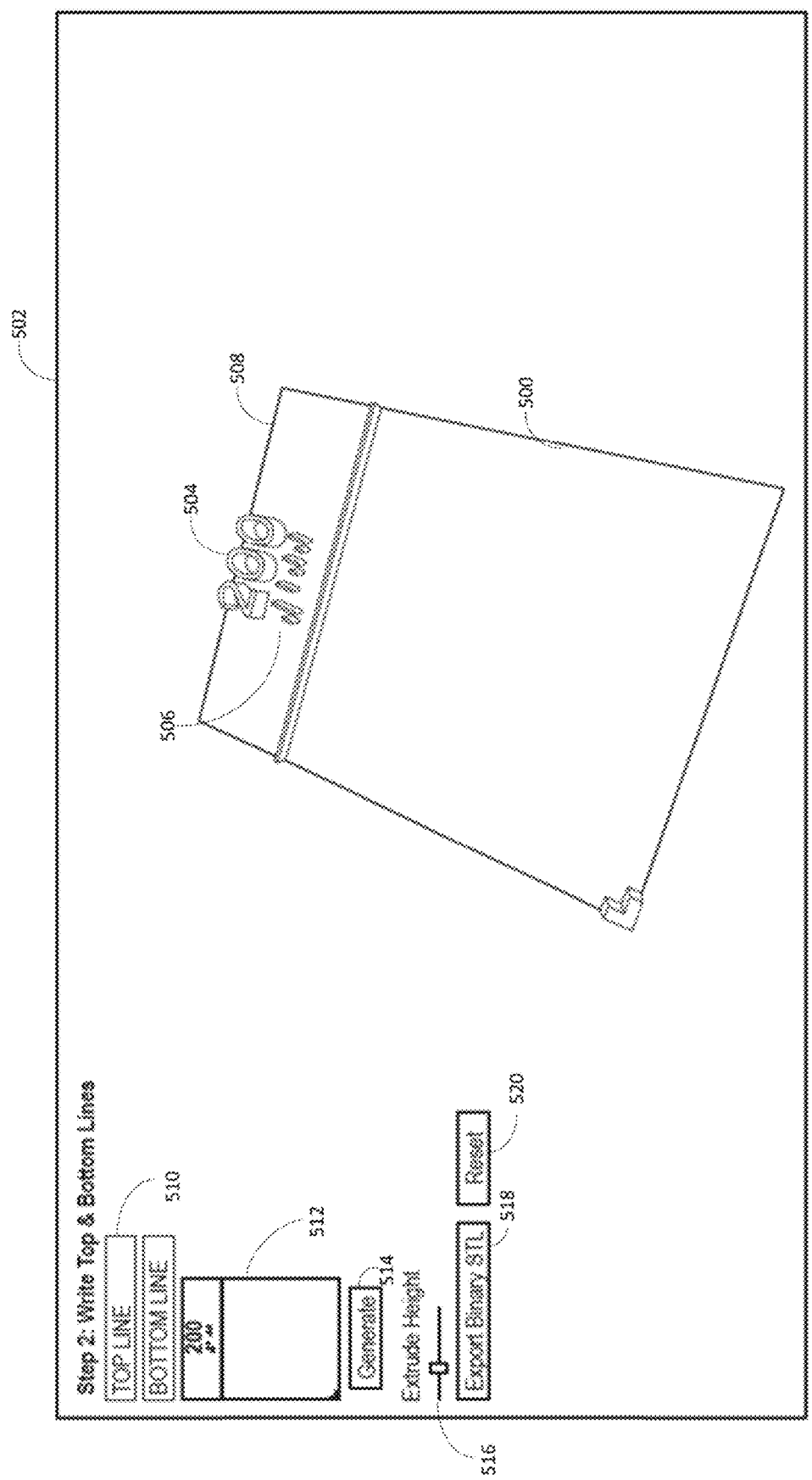
FIG. 5 is an illustration of a three-dimensional printable model of a single room map template generated from a corresponding two-dimensional image, according to some embodiments.

Turning now to FIG. 5, a 3D model 500 of a map is shown within a 3D modeling tool interface 502, according to some embodiments. In one embodiment, the 3D model is generated by the 3D model builder 124. In further embodiments, the 3D modeling tool interface 502 is a user interface within the 3D model builder 124. The 3D model 500 includes text portion 504, and a braille portion 506. In one embodiment, the braille portion 506 may be a braille translation of the text portion 504. However, in other embodiments, the braille portion 506 may contain more or different information from the text portion 504. In one embodiment, the text portion 504 and the braille portion 506 are located in a header object 508 of the 3D model 500. The header object 508 may be similar to header object 302, described above.

The 3D modeling tool interface 502 may include one or more controls to allow for the 3D model to be modified and/or edited. The controls may include one or more sizing controls 510. The sizing controls 510 may allow for the 3D model to be edited for size by the user by adjusting one or more axis of the 3D model. The 3D modeling tool interface 502 may further include a 2D representation window 512. The 2D representation window 512 may provide a 2D image of the 3D model 500. In some embodiments, the 2D representation window 512 may allow the user to edit the 2D image via the 2D representation window 512. The user may then be able to regenerate the 3D model 500 after modifying the 2D image via 2D representation window 512 by interfacing with a generate icon 514. The user may be able to adjust the scale of the 3D model 500 and/or one or more included objects via the extrusion height adjustment tool 516. The extrusion height adjustment tool 516 may allow a user to manually set the heights of one or more objects in the 3D modeling tool interface 502. Once the user is finished modifying the 3D model 500, the user can export the 3D model as one or more 3D file types via the export interface 518. For example, the 3D modeling tool interface 502 may export the 3D model 500 as a .obj file, a stereolithography (.stl) file, or other applicable 3D files. These outputted filed may be readable by a 3D printer or other manufacturing device to create 3D objects based off of the 3D model 500. Finally, the user may undo all edits made via the reset interface 520.

Figure 6:
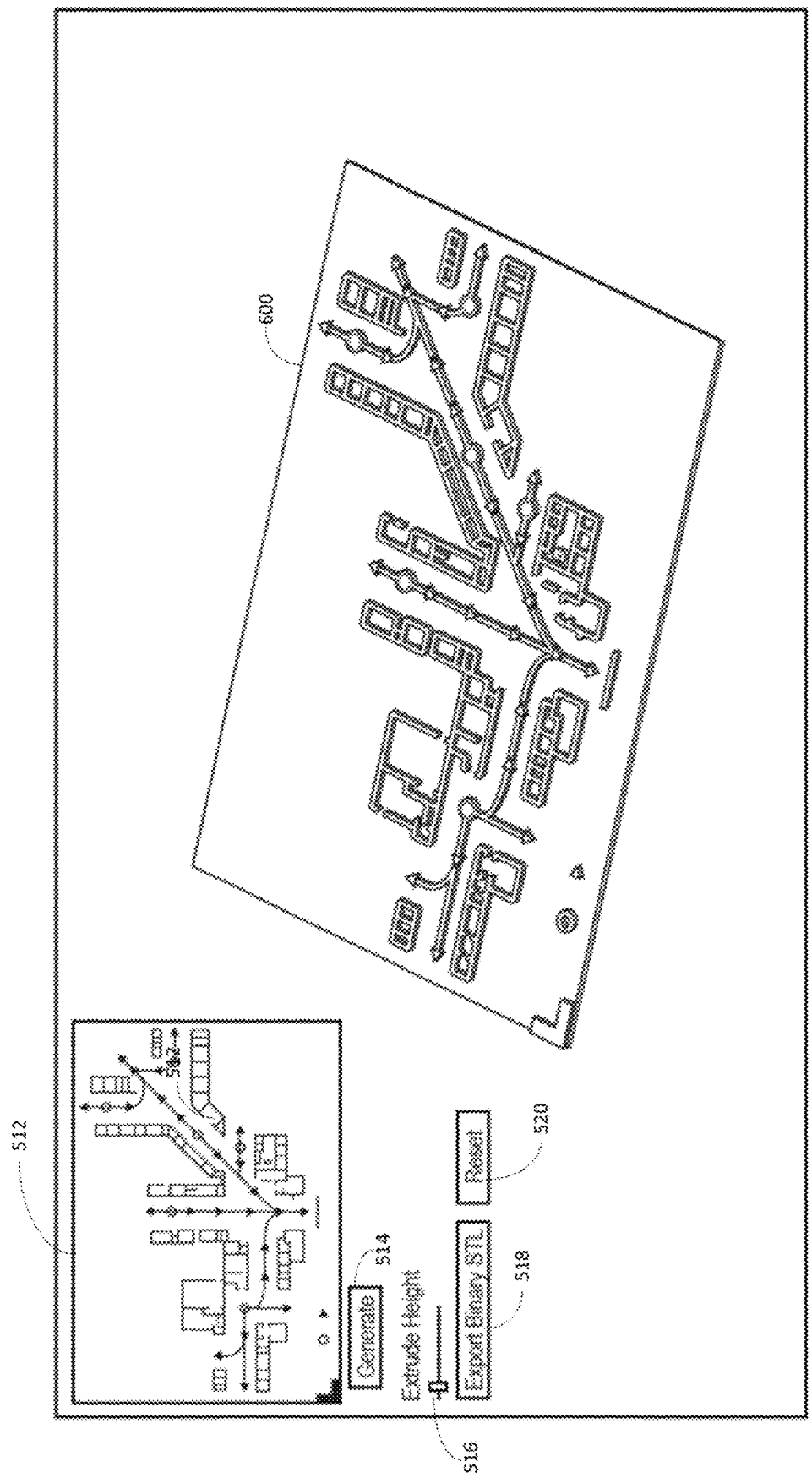
FIG. 6 is a screenshot illustrating a user interface displaying a three-dimensional model of a floor map generated from a two dimensional image, according to some embodiments.

Turning now to FIG. 6, a further illustration of the 3D modeling tool interface 502 is shown, according to some embodiments. Similar to FIG. 5, there is shown a 3D map model 600, along with the 2D representation window 512, the generate icon 514, the extrusion height adjustment tool 516, the export interface 518, and the reset interface 520. As shown in FIG. 6, the 3D map model 600 is shown in the 2D representation window as a two dimensional map. The 3D map model may be displayed in the lower portion of the 3D model 500 shown above, in some examples. The 3D map model 600 shows a representation of a map with an evacuation path 602. However, it is contemplated that the 3D map model 600 can be any type of 3D image.

Figure 7:
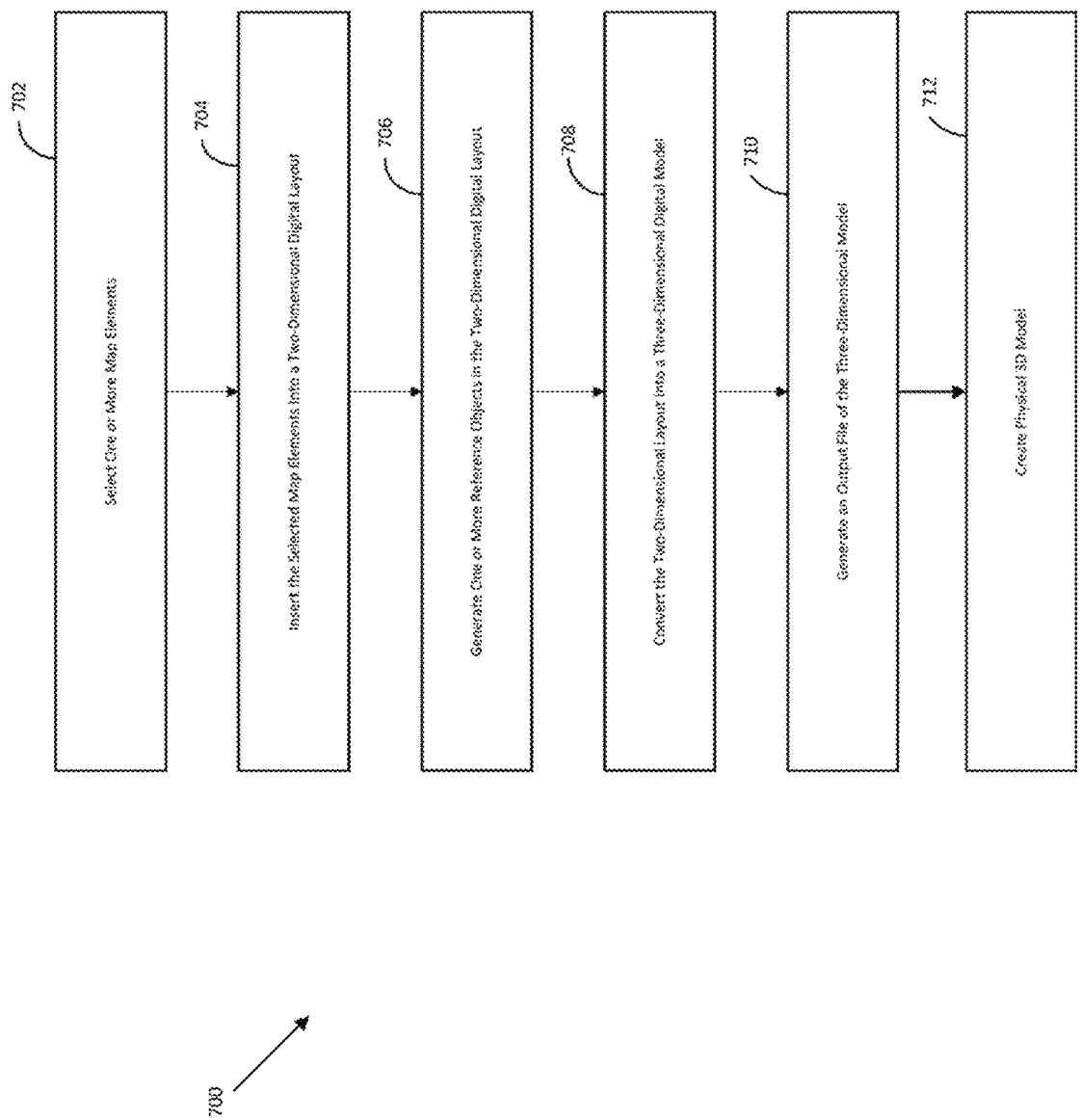
FIG. 7 is a flow chart illustrating a process for generating a tactile 3D object, according to some embodiments.

Turning now to FIG. 7, a process 700 for generating and outputting 3D models from a 2D image is shown, according to some embodiments. The process 700 may be executed using the tool 100, described above. At process block 702, one or map elements are selected. In one embodiment, the map elements are selected via the user interface 104. In further embodiments, the map elements are predetermined map symbols, such as those described above. These predetermined map elements may be selected by the user within the mapping module 118. In other embodiments, the map elements may be selected based on a tracing function performed using the tracing module 120. For example, a user may use a tracing tool associated with the tracing module 120 to trace along an image provided to the tool 100. The tracing tool may generate tracing lines or other shapes based on the tracing performed by the user. The user may then select one or more of the tracing lines/shapes via the user interface 104. In still further embodiments, the map elements may be one or more objects generated by the scanning module 122. For example, the scanning module 122 may scan an image and automatically generate one or more map elements that may then be selected by a user. In still further embodiments, the map elements may include a three dimensional code generated by the three dimensional code generator 126, as described above.

Figure 8:
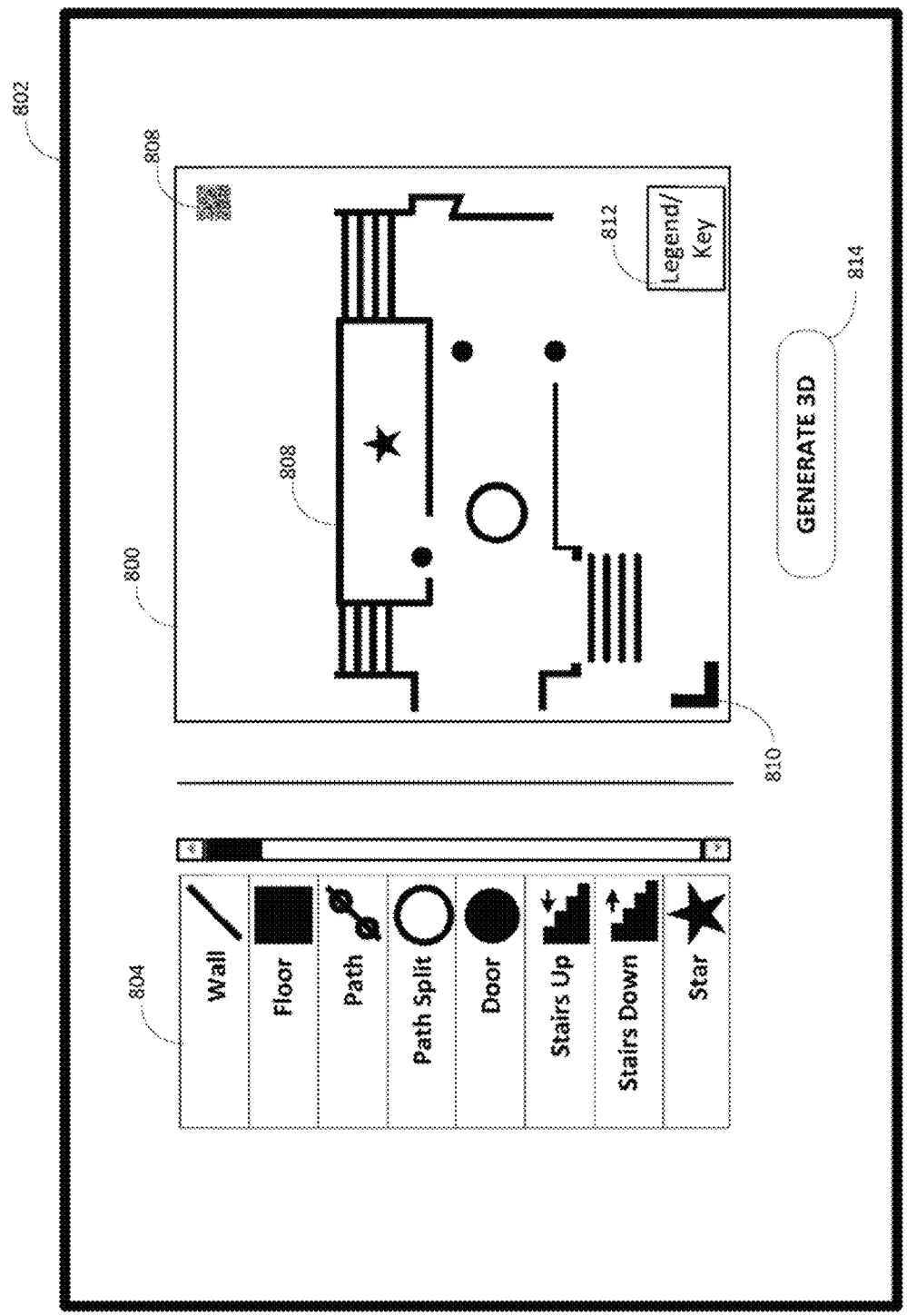
FIG. 8 is a screen shot of a two dimensional mapping tool, according to some embodiments.

At process block 704, the selected map elements are inserted into a 2D digital layout. In some embodiments, the 2D digital layout may be similar to interface 200, shown above. Turning now to FIG. 8, a 2D digital layout 800 is shown being displayed within an interface 802. Interface 802 may be similar to interface 200 described above. Interface 802 illustrates a number of map elements 804 that may be selected by a user, as described above. The 2D digital layout 800 contains the selected map elements 806, as shown. As shown in FIG. 8, the inserted map elements may include walls, stairs, doors, etc. In some examples, the map elements may be associated with different layers of the 2D digital image, which can allow the elements to later be separately generated in 3D models, allowing the layers to be 3D printed as separate colors, such as when using a multi-extrusion 3D printing device.

Further, as stated above, the map elements may include a 3D code symbol, such as 3D code symbol 808 shown in FIG. 8. In one embodiment, the 3D code symbol 808 is a QR code symbol. As described above, the 3D code symbol may be associated with an audio, or other multi-media file stored on an internet connected server. A user may scan the 3D code symbol using an internet connected device, which will allow the user to access the multi-media file from their device. In some embodiments, the multi-media file may contain information related to a map, or other printed object. In other embodiments, the multi-media file may contain information about the building or structure associated with the 2D digital image. In some embodiments, the 3D code symbols allow text to be input that is associated with the 3D code symbol, which is later converted to an audio file, and accessed as described above.

At process block 706, one or more reference objects may be generated and located in the 2D digital layout. Reference objects may include orientation objects (e.g. corner designator, compass rose, etc.), as well as legends or keys. Turning again to FIG. 8, an orientation object 810 is shown, along with legend/key 812. The legend/key 812 may provide an indication as to the meaning of the symbols in the 2D digital image. The legend/key may 812 contain representations of the map elements, along with text or braille explanations, in some embodiments.

At process block 708, the 2D digital image is converted into a 3D model. In some embodiments, the 2D digital image is converted to the 3D model based on a user command. For example, the user may interface with an input device, such as the generate 3D input device 814, as shown in FIG. 8. In one embodiment, the 3D model builder 124 generates the 3D model from the 2D digital image. For example, the 3D model builder 124 may sample pixel locations and/or colors within the 2D digital image to create one or more 3D mesh vertices. In one embodiment, the height of the 3D mesh vertices are determined by various parameters of the 2D digital image, such as pixel color values, and/or one more tactile map rules. In one example, a 3D cube may first be created and be sized according to the specific resolution of the 2D digital image and desired size of the map (e.g. 3D model). The 3D mesh vertices are then raised as described above for individual pixel, which is then replicated for each mesh vertices, thereby creating a 3D model of the 2D digital image.

Figure 9:
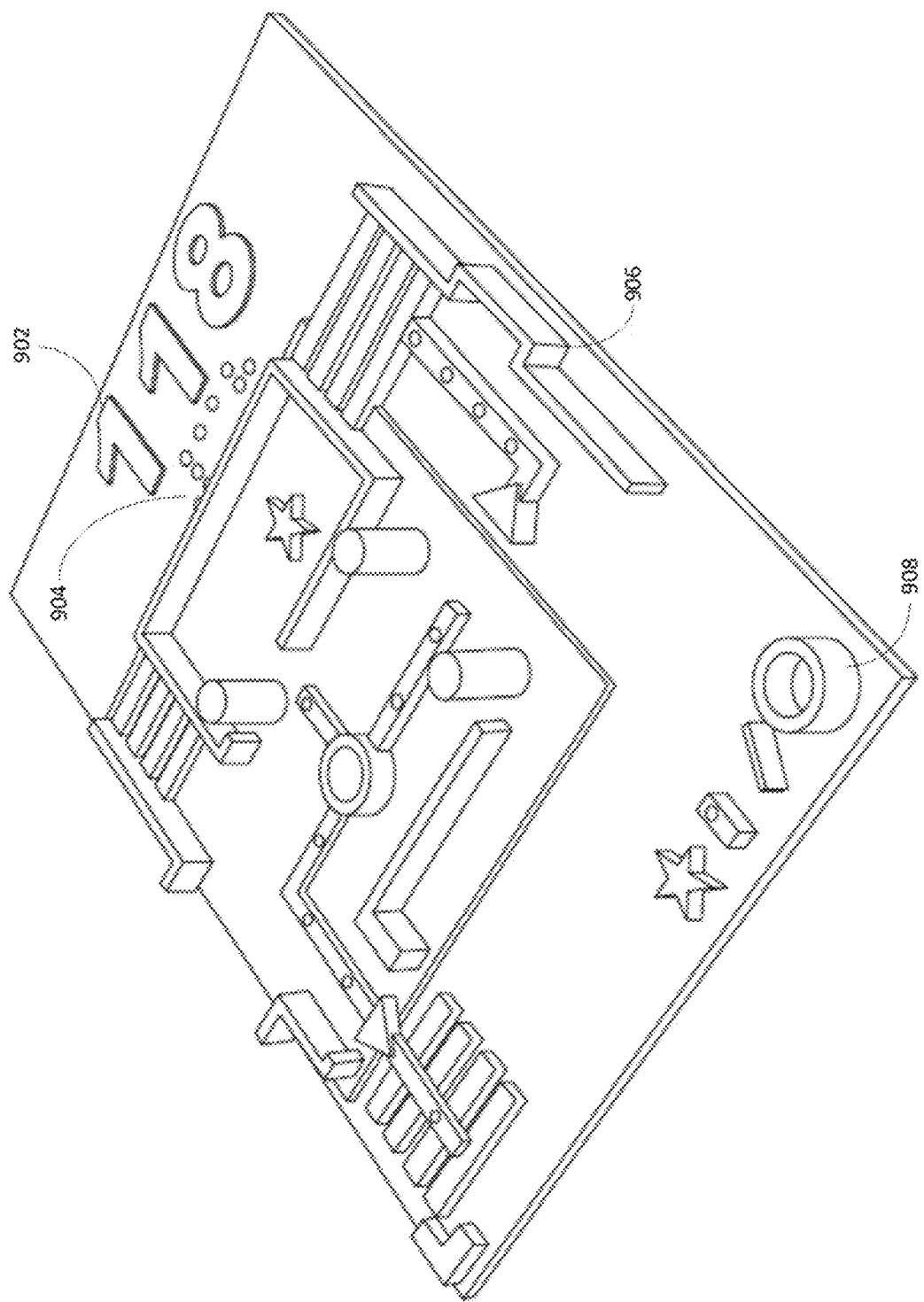
FIG. 9 is an illustration of a three dimensional model of the two dimensional map of FIG. 7, according to some embodiments.

Turning now to FIG. 9, a 3D model 900 of the 2D digital layout 800 is shown, according to some embodiments. As shown in FIG. 9, the 3D model 900 includes a textual room number 902 and a braille room number 904. The 3D model 900 further includes a number of 3D map elements 906, which are 3D representations of the 2D map elements 806, shown in FIG. 8. The 3D model 900 further includes a 3D legend/key 908, as well as a 3D orientation symbol 910. In some embodiments, the user may further edit the 3D model 900, as described above. For example, the user may edit the 3D model using the 3D model builder 124 in combination with the user interface 104.

Figure 10:
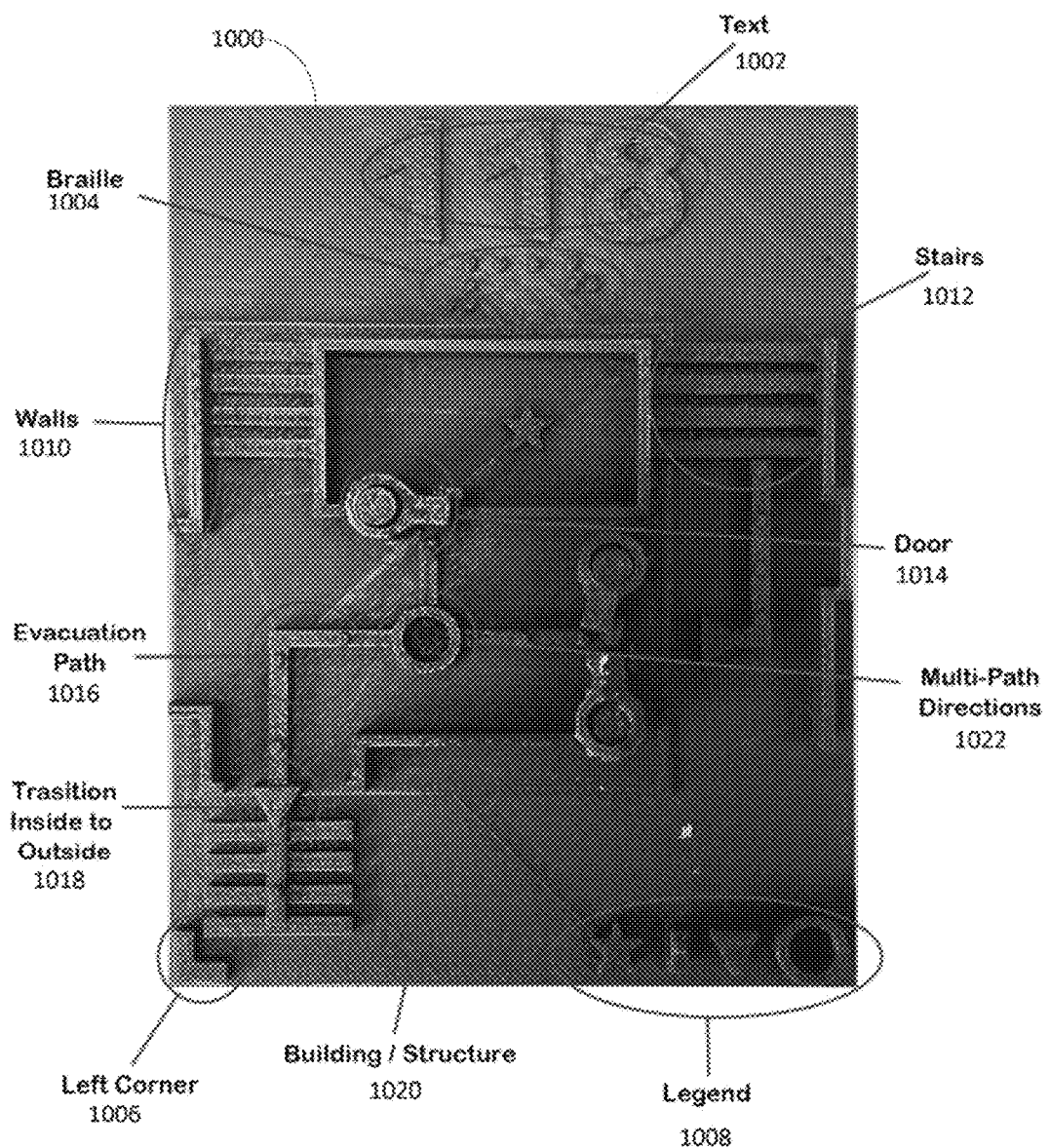
FIG. 10 is a representation of a three dimensionally printed representation of the three dimensional model of FIG. 8, according to some embodiments.

At process block 710, the 3D model is output as a 3D compatible file. As described above, the 3D file may be a .obj file, a .stp file, or other 3D file types, as applicable. The 3D files may be configured to be read by a 3D printing device, such as the 3D printing devices described above. At process block 712, a physical 3D model may be generated based on the output file. Turning to FIG. 10, a representative physical 3D model 1000 is shown, according to some embodiments. As shown in FIG. 10, the physical 3D model 1000 is a physical representation of the 3D model 900. Similar to the 3D model 900, the physical 3D model includes a textual room number 1002, a braille room number 1004, an orientation object 1006, and a legend/key 1008. The physical 3D model also includes one or more map elements, such as map elements 904. The map elements may include walls 1010, stairs 1012, doors 1014, evacuation paths 1016, transitions from inside to outside 1018, the building/structure outline 1020, and/or multi-path directions 1022. In some embodiments, the physical map elements are of the exact size and shape necessary for blind or vision impaired persons to acquire appropriate information about the physical structures. Further, the physical map elements may be actuatable and/or movable within the physical 3D model 1000. For example, doors may be movable, thereby allowing the user of the physical 3D model 1000 to gain information about the direction of the door opening and closing (e.g. push and pull) properties of the doors on the physical 3D model 1000.

Figure 11:
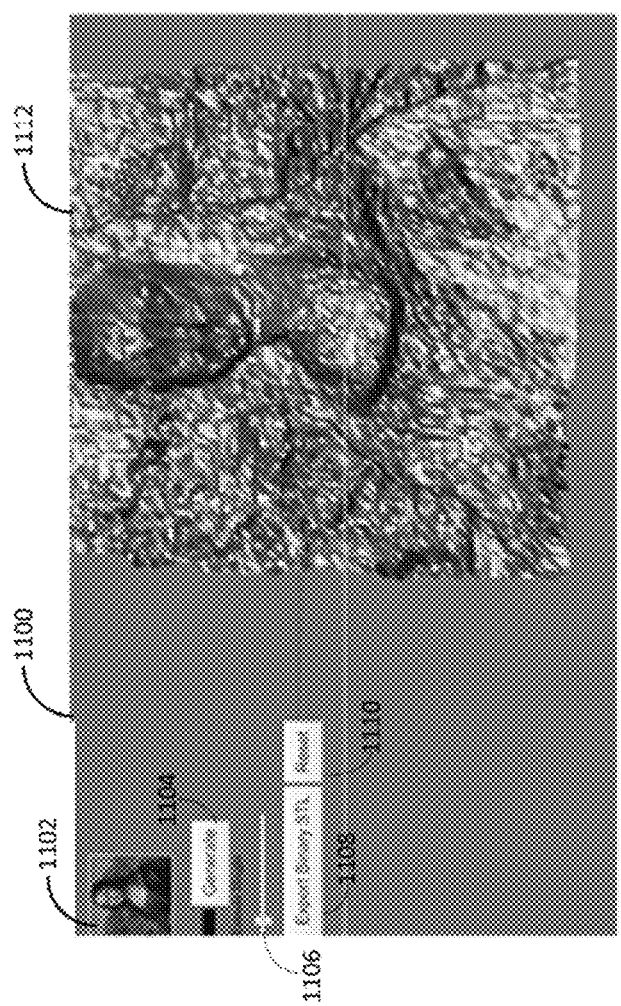
FIG. 11 is a screen shot of a scanning function of the herein described tool, according to some embodiments.

Turning now to FIG. 11, an example interface 1100 of a scanning module interface is shown. The interface 1100 contains the source image reference area 1102, an input mechanism 1104, a magnification interface 1106, an export interface 1108, a reset interface 1110, and the scanned image display 1112. As shown in the FIG. 11, the scanned image display 1112 generates a 3D model off of a 2D source file. Once the 2D source file is loaded and orientated by the user, the user may generate the 3D model via the input mechanism 1104. The user may then change the magnification of the generated 3D model via the magnification interface, and finally export the generated 3D model using the export interface 1108. Similar to above, the generated 3D model may be exported as an .obj file, a .stp file, or any other file compatible with 3D printing or manufacturing devices.

In some embodiments, the tool 100 may be configured to generate other maps from a 2D digital image, such as a haptic feedback map. A haptic map may utilize various haptic feedback options to relay information about the 2D digital image to a visually impaired person. For example, a haptic map may rely on different vibrations to provide information to a visually impaired person. In other embodiments, haptic feedback may be based on sound, other non-visual signals, and/or a combination of sound and vibrations. Vibrations in a haptic map may vary in intensity, pattern, frequency, and/or any combination thereof. The different vibrations may provide indications of different objects in the map, such as those described above. In some embodiments, a haptic map may be presented to a user via an internet connected device, such as a smartphone. The map may be provided to the user via an interface of the internet connected device, which the user can interface with. For example, a touchscreen may sense a touch of the user, and provide one or more haptic feedback signals based on the location of the touch on the touchscreen of the user interface of the internet connected device. Other examples of internet connected devices may include tablet computers, smart watches, or other devices having an ability to receive an input from the user and output one or more types of haptic feedback based on the user input.

Similar to the three dimensional maps and models described above, the tool 100 may generate the haptic map based on a 2D digital image. Similar to the 2D digital images above, a user may input multiple objects into the 2D digital image, which can then be converted to haptic objects, as described below. Further, the tool 100 may automatically space and/or size the 2D objects based on one or more rules for haptic objects. This can ensure that the haptic objects are sufficiently sized and spaced to allow for a visually impaired user to be able to accurately interpret the haptic map. In some examples, a user may be able to manually define sizes and spacing of the haptic objects. In some embodiments, the tool 100 may utilize metadata associated with the 2D digital image to define areas that will require haptic feedback. Example metadata may include 2D object definitions, object boundary, defined boundaries (e.g. spaces created via placement of certain objects, such as wall objects), object data, spacing and sizing rules, etc.

The tool 100 may transmit the haptic map to a webpage or other hosted site via the communication interface 106. In some embodiments, the haptic map may be stored on a server, such as the cloud-based server 112 and/or the local server 114. The haptic map may then be accessed via the internet connected device via a server side application, such as a website or other link to server hosting the haptic map. In some embodiments, the haptic map is accessed via a web browser of the internet connected device. In other embodiments, the haptic map is accessed via an application executed on the internet connected device. In still further embodiments, the haptic map may be downloaded and stored on the internet connected device.

Figure 12:
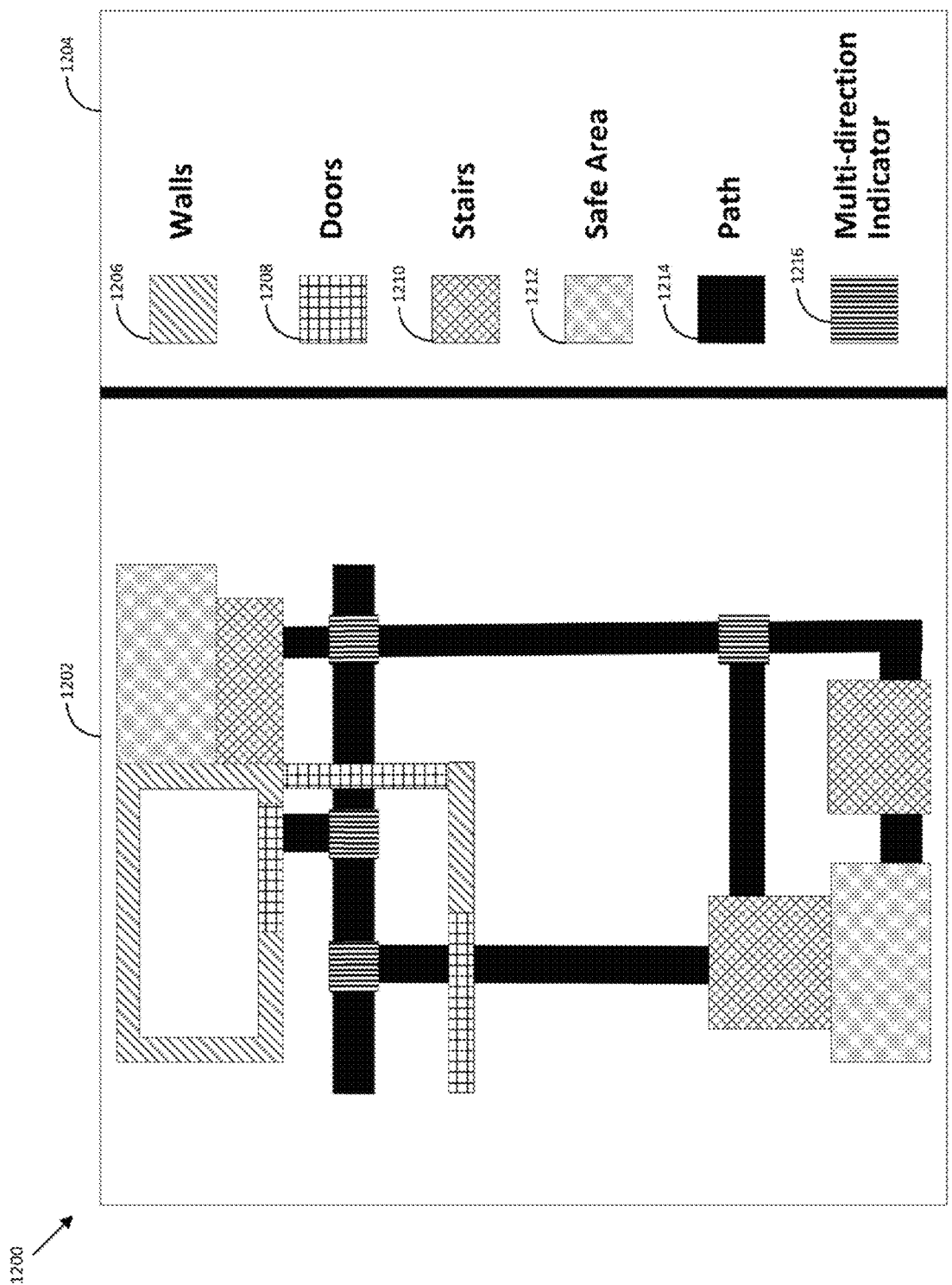
FIG. 12 is an illustration of a haptic map generated based on a two dimensional digital image.

Turning now to FIG. 12, an example haptic map 1200 is shown, according to some embodiments. As described above, the haptic map 1200 may be provided to a user on an internet connected device, such as a smartphone. The haptic map 1200 may include a map portion 1202 and a legend portion 1204. The map portion 1202 may contain one or more areas that are associated with different haptic feedback objects, such as vibrations or sound, as shown in FIG. 12. The haptic feedback objects may relate to the haptic feedback outputs shown in legend portion 1204. Haptic feedback objects may include wall objects 1206, door objects 1208, stair objects 1210, safe area objects 1212, path objects 1214, and/or multi-direction indicator objects 1216. These haptic feedback objects are similar to the map objects described above, and may also include other haptic objects, such as orientation objects, text objects, Braille objects, etc. As shown in the map portion 1202, the haptic feedback objects can be used to create a map based on the haptic feedback objects (e.g. rooms, paths, egress routes, etc.). While the map portion 1202 and the legend portion 1204 are shown as having visual elements in FIG. 12, in some embodiments, the haptic map 1200 may not include any visual indicators, and will rely solely on the haptic objects to relay information to the user. In some further examples, additional data may be provided to the user via the haptic map 1200, such as using audio (e.g. to provide instructions or other information), as well as vibrations which may be interpreted as Braille letters or words by the user). This can allow for substantial amounts of information to be provided to the user via the haptic signals.

Various features and advantages of the disclosed technology are set forth in the accompanying drawings and the above description.

The invention claimed is:

1. A method for generating three dimensional indicators for the visually impaired, the method comprising:
   (a) generating a two dimensional digital map layout corresponding to a building, selectively using at least one of a mapping approach, a tracing approach, or a scanning approach;
   (b) obtaining one or more pre-designed symbols from a plurality of pre-designed symbols, wherein the pre-designed symbols represent building layout features and are sized to be readable via a physical touch;
   (c) inserting a first selected pre-designed symbol into the two dimensional digital map layout at a first desired location;
   (d) inserting a second selected pre-designed symbol into the two dimensional digital map layout at a second desired location;
   (e) automatically re-sizing the first pre-designed symbol, after the second pre-designed symbol is added;
   (f) automatically spacing the first and second pre-designed symbols;
   (g) generating one or more of an orientation object and a legend object into the two dimensional digital map layout;
   (h) converting the two dimensional digital map layout into a haptic feedback map file;
   (i) generating a haptic feedback map from the haptic feedback map file, configured to provide a visually-impaired reader with information about the two dimensional digital layout via haptic feedback and having different vibrations corresponding to different pre-designed symbols; and
   (j) generating an output file including the haptic feedback map to be deployed for the visually-impaired reader a user device having a reader interface.

2. The method of claim 1, further comprising generating a three dimensional data code object within the two dimensional digital map layout; wherein the three dimensional data code is configured to access an audio file associated with the two dimensional digital layout.

3. The method of claim 2, wherein the three dimensional data code is recognizable by an internet connected electronic device, the internet connected electronic device configured to access the audio file on a server based on data contained in the three dimensional data code.

4. The method of claim 2, wherein the three dimensional data code is a QR code.

5. The method of claim 1, further comprising:
   entering text into the two dimensional layout; and converting the text into braille in the two dimensional layout.

6. The method of claim 1, wherein the pre-designed symbols are selected from a list consisting of a stair symbol, a door symbol, an elevator symbol, a hallway symbol, and an evacuation route symbol.

7. The method claim 1, wherein the three dimensional model includes multiple layers.

8. The method claim 7, wherein the layers in the three dimensional model are rendered as different colors.

9. The method of claim 1, further comprising:
uploading an image; and
tracing the image to generate the two dimensional digital layout.

\* \* \* \* \*